United States Patent [19]

Kaneko et al.

[11] 3,737,584

[45] June 5, 1973

[54] MALFUNCTION MONITORING EQUIPMENT FOR A TIME DIVISION MULTIPLEXED TRANSMISSION SYSTEM

[75] Inventors: Haruo Kaneko; Kaoru Yano, both of Tokyo, Japan

[73] Assignee: Nippon Electric Company Limited, Tokyo, Japan

[22] Filed: Dec. 9, 1970

[21] Appl. No.: 96,555

[30] Foreign Application Priority Data

Dec. 16, 1969 Japan ..............................44/101482

[52] U.S. Cl. ..........................179/15 BP, 179/175.31

[51] Int. Cl. ................................................H04b 3/46

[58] Field of Search......................179/175.3, 175.31, 179/15 BP, 15 BF

[56] References Cited

UNITED STATES PATENTS

| | | | |
|---|---|---|---|
| 2,605,333 | 7/1952 | Job | 179/175.31 R |
| 2,974,224 | 3/1961 | Ule | 179/15 BP |
| 3,617,656 | 11/1971 | Elliot | 179/175.3 |

*Primary Examiner*—Thomas B. Habecker
*Attorney*—Sandoe, Hopgood & Calimafde

[57] ABSTRACT

A malfunction monitoring system for the analog circuit of a time division multiplexed pulse code modulation system uses a noise signal as the pilot signal.

5 Claims, 5 Drawing Figures

INVENTORS
HARUO KANEKO
KAORU YANO
by
Sandoe, Hopgood & Calimafde
ATTORNEYS

*INVENTORS*
HARUO KANEKO
KAORU YANO by

Sandoe, Hopgood & Calimafde
ATTORNEYS

MALFUNCTION MONITORING EQUIPMENT FOR A TIME DIVISION MULTIPLEXED TRANSMISSION SYSTEM

The present invention relates generally to monitoring equipment for the analog circuit of a time division multiplexed pulse code modulation communication system, and especially to a malfunction monitoring system using a pilot signal.

In general, when a fault occurs in a communication system, it is urgent to locate the location of the fault and to restore the communication system by replacing or repairing faulty portion of the system or by repairing the wrong portion. A time division multiplexed pulse code modulation communication system includes terminal equipments and a repeatered line, the former in turn consist of a digital circuit and an analog circuit. Most of the faults in the repeatered line and the digital circuit can be detected by monitoring frame synchronization. This method, however, can not detect faults in the analog circuit. A prior-art method of monitoring faults in the analog circuit is to transmit a pilot signal by inserting it in an idle channel at the transmitter, and to monitor the pilot signal at the receiver. In this method, the pilot signal is a direct current pilot signal or a periodic pulse stream. For example, the method disclosed in U.S. Pat. No. 3,259,695 "Malfunction monitoring of time division multiplex PCM Equipments" by Ryuichi Murakami makes use of a direct current pilot signal. The reason for the use of a direct current pilot signal is that the coding system hitherto employed utilizes a combination of an instantaneous compandor, a linear coder and a decoder; and that the main purpose of the pilot signal monitoring is to detect direct current drifts in the coder and the decoder as well as the increase of nonlinear distortions caused by an abnormal temperature of the oven containing the semiconductor diodes of the instantaneous compandor. Since changes in the direct current operating point of the coder and the decoder in response to changes in the temperature of the oven cause the level of the received pilot signal to change, faults in the coder, decoder and oven as well as level-off's and wide range level deviations in the analog circuit can be detected by monitoring the pilot signal level. However, some portions of the analog-to-digital and the digital-to-analog converters of the coder and the decoder can not be monitored by this method. Since the pilot signal in the prior art method is direct current or periodic pulse stream, the coded pilot signal output assumes one or two particular code patterns. A weighting network in the decoder operates in accordance with this pattern to generate a corresponding analog signal. Even if the switching circuit actuating the weighting network is so damaged as to be fixed in a state of either "1" or "0," a pilot fault alarm will not be generated so long as such a state is not contradictory to the pilot signal pattern. Similar faults may occur in the coder. Considering the reliability of components, however, it is probable that most of the faults in the coder and the decoder cooperating with the instantaneous compandor occur in the principal portions of the instantaneous compandor, the decoder and the coder, while the relative number of such faults that can not be detected by means of the direct current pilot signal, as described above, is low.

A segment type nonlinear coding system has recently been proposed that has been generally adopted as the standard system. In this system the instantaneous compandor is not used, and therefore a monitoring system suitable for monitoring faults in the coder and the decoder should be employed rather than the direct current pilot system suitable for monitoring faults peculiar to the coder and the decoder cooperating with the instantaneous compandor. One such method is to use a sinusoidal wave of a single frequency as the pilot signal. With this method the circuit can be simplified if the pilot signal is derived by dividing the sampling frequency. However, since the ratio of the pilot signal frequency to the sampling frequency is always constant, the sampling point is fixed at a few points. Therefore, only a few variations of the coded output patterns can be generated, hence it becomes impossible to detect completely faults in the coder and the decoder. This disadvantage can be eliminated by choosing the pilot signal frequency independent of the sampling frequency, which may be realized by the use of a special oscillator for generating the pilot signal, although the circuitry required becomes a little more complicated. The method in which a sinusoidal wave is used as the pilot signal is thus a good way of monitoring the operations of the coder and the decoder, but it has a fatal disadvantage of introducing cross-talk between time-slots, which is inevitable because of the band-limit of amplifiers, as the pilot signal which must be transmitted through an idle channel is multiplexed with the signals of other channels. The cross-talk occurring in the stages before coding, however small it may be, has a chance of reaching the so-called floor level of cross-talk which is decided with the quantizing step. Even if the cross-talk is not magnified to the floor level of cross-talk, an unallowable level may be reached since a single-tone in the audio band has a remarkable interfering effect on the auditory sense. The cross-talk will increase especially when the amplitude of the sinusoidal wave, whose peak factor (ratio of peak-to-peak value to root mean square value) is approximately 3 dB, is chosen as large as possible so as to sweep all of the coded patterns in order to monitor effectively the malfunctions of the coder and the decoder. Furthermore, since the slope of the sinusoidal wave in its lower level region is steeper than that in its higher level region, it often becomes impossible to monitor the malfunction in the lower level region.

An object of this invention is to provide a pilot malfunction monitoring equipment which eliminates the disadvantages of prior-art pilot malfunction monitoring equipment, and is suitable for malfunction monitoring of time division multiplexed pulse code modulation communication systems employing the nonlinear coding method.

The principle of this invention is that a noise signal such as white noise is inserted in an idle channel as the pilot signal, sampled and coded, and then is transmitted through a transmission line to the receiving terminal, where it is decoded and demodulated for monitoring the noise signal or the distortion noise such as the quantizing noise at the pilot channel output. In contrast with the single-tone cross-talk to other channels which is, as described above, a disadvantage of the pilot monitoring system utilizing a single-frequency sinusoidal wave, the interference with other channels caused by cross-talk when noise is used as the pilot signal can be reduced markedly as compared with noise generated in these channels from other causes, thus preventing the degradation of the characteristics of these channels. It can be said, therefore, that noise is suitable for the pilot signal for time division multiplexed pulse code modulation systems. Further, when a noise signal having a large peak factor (approximately 12 dB) is used as the pilot signal, a small power level is enough to sweep many coded patterns, so that the effective check of the operations of the coder and the decoder is achieved with less interference with other channels. By the use of noise as the pilot signal, severe faults in the coder and the decoder can be detected by monitoring only the pilot signal output level at the receiving terminal, and even slight faults can be detected by using a band-limited noise signal as the pilot signal and monitoring, at the receiving terminal, the distortion noise such as the quantizing noise falling out of the frequency band of the pilot signal.

This invention will now be described with reference to the accompanying drawings.

Figures 1, 2:
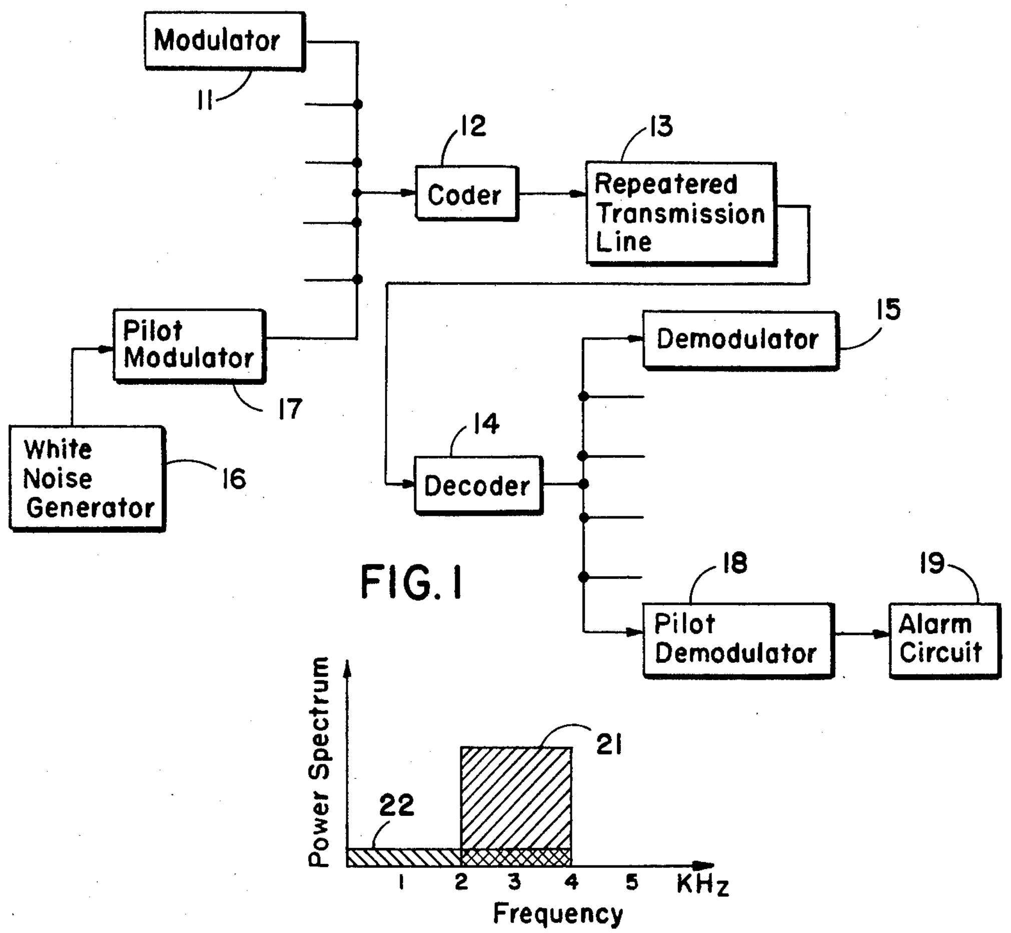
FIG. 1 is a block diagram of an embodiment of this invention.
FIG. 2 is a chart for explaining a modification of the embodiment of FIG. 1.

In FIG. 1 which shows a first embodiment of this invention, a signal sampled and pulse-amplitude-modulated by a modulator 11 is time division multiplexed with the signals of other channels and a pilot signal, the latter being obtained by sampling and pulse-amplitude-modulating the output noise from a white noise generator 16 by a pilot modulator 17. These multiplexed signals are coded by a coder 12, the output of which is transmitted via a repeatered transmission line 13 to a receiving terminal, at which it is decoded into analog signals by a decoder 14, which are then applied to channel demodulators 15 which perform channel separation and demodulation on these signals. The pilot signal is demodulated by a pilot demodulator 18. When the level of the demodulated output is abnormal, it is detected by an alarm circuit 19 to make an alarm indication. This basic structure itself of the monitoring system is similar to those of prior-art systems, but the essential feature of this invention lies in the use of noise as the pilot signal for a time division multiplexed pulse code modulation communication system.

Referring now to FIG. 2 which explains a modification of the embodiment of FIG. 1, wherein white noise which is band-limited to 2~4KHz is used as the pilot signal. If the spectrum of the pilot signal is distributed uniformly from 2 to 4 KHz, as shown by 21, the spectrum of the demodulated output passing through the pulse code modulation system is given by superposing the spectrum of the signal 21 on that of the distortion noise component, such as the quantizing noise, signal 22. As the spectrum of the quantizing noise component appearing as a result of the insertion of the pilot signal is flat between 0 and 4 KHz, the power of the noise component falling within 0~2KHz occupies about a half of the whole distortion noise power. By monitoring the power of the noise component below 2 KHz, which can be extracted by a low-pass filter having a cut-off frequency of 2 KHz, the faults in the coder and the decoder which may appear as an increase of the quantizing noise can be detected easily. Since the quantizing noise actually determines the communication quality, it is preferable to monitor the quantizing noise level rather than the pilot signal level.

Figure 3A:
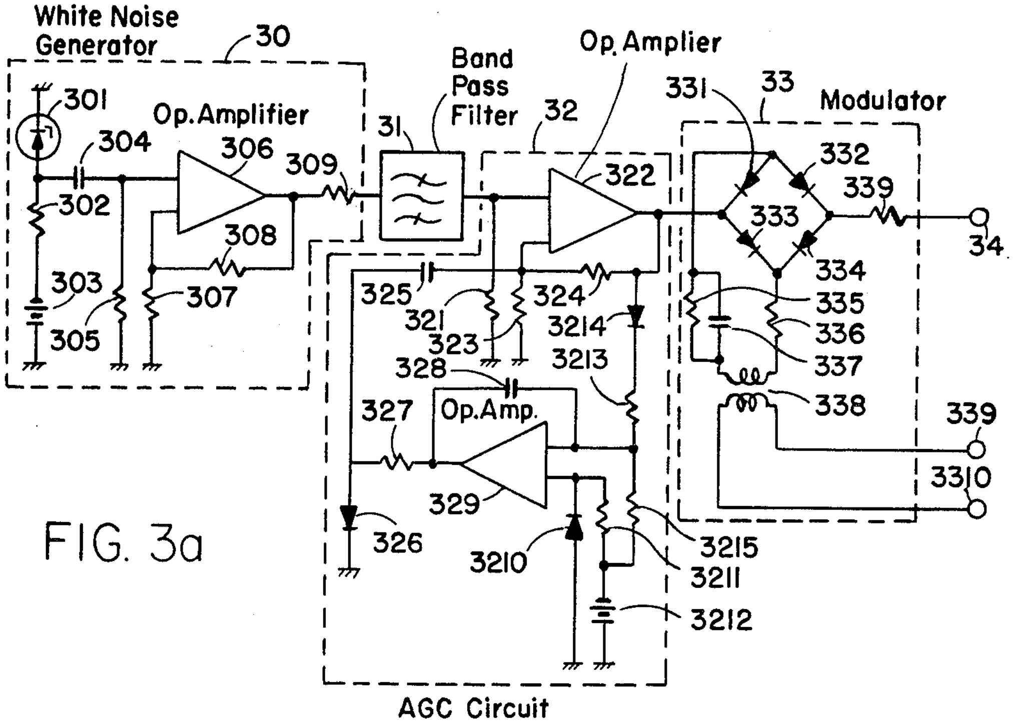
FIG. 3 is a circuit diagram of the embodiment as shown in FIG. 1.
Figure 3B:
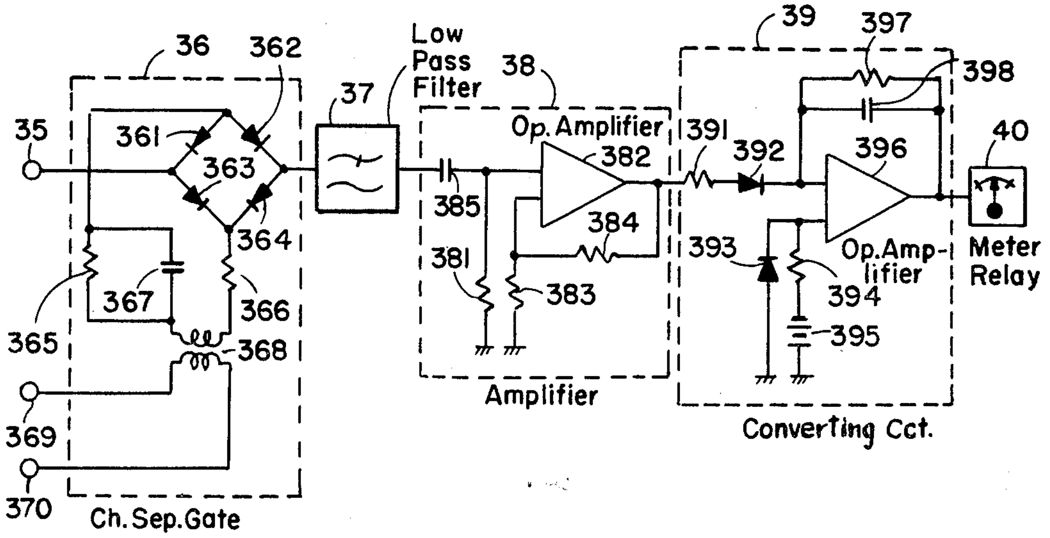

A detailed structure of this system is shown in FIG. 3, of which (a) is the transmitting terminal and (b) is the receiving terminal. White noise generated by a noise generator 30 is band-limited to 2~4KHz by a band-pass filter 31, the output noise power of which is kept constant by an automatic gain control (AGC) circuit 32. The output of the AGC circuit 32 is then sampled by a modulator 33 and supplied via a output terminal 34 to a coder apparatus. In detail, the noise generator 30 consists of a noise generating circuit comprising a zener diode 301, a resistor 302 and a power supply 303, and an amplification circuit comprising a capacitor 34, resistors 305, 307, 308 and 309 and an operational amplifier 306. The power supply 303 together with the resistor 302 supplies a bias current to the zener diode 301, which generates a wide-band noise. This noise is amplified by the operational amplifier 306 provided with a series feedback (for example type $\mu$A-709 IC manufactured by Fairchild). The output noise from the noise generator 30 is applied to the band-pass filter 31 whose output noise is band-limited to 2~4KHz. The output noise from the band-pass filter 31 is applied to the automatic gain control circuit 32, which consists of an AGC amplifier comprising resistors 321, 323 and 324, an operational amplifier 322 (above-mentioned type $\mu$A-709 IC, for example), a capacitor 325 and a diode 326, and a control circuit comprising resistors 327, 3211, 3213 and 3215, an operational amplifier 329, a capacitor 328, diodes 3210 and 3214 and a power supply 3212. The control circuit converts the output noise from the AGC amplifier to a rectified direct current, which is kept equal to the reference current supplied from the power supply 3212 via the resistor 3215 by controlling the gain of the AGC amplifier. The operational amplifier 329 amplifies the error signal resulting from the difference between the reference current and the rectified current to control the bias current flowing through the diode 326, thereby adjusting the gain of the AGC amplifier. The output noise from the AGC circuit 32 is converted to a PAM signal by the modulator 33 and then is fed to the coder. The modulator 33 consists of a diode gate comprising diodes 331, 332, 333 and 334, and a gate drive circuit comprising resistors 335 and 336, a capacitor 337 and a transformer 338. The transformer 338 is supplied with modulation pulses of 8 KHz repetition rate at its terminals 339 and 3310.

In the receiving terminal, a terminal 35 receives the decoder output, which is separated from the pulse amplitude modulation signals of other channels by a channel separation gate 36 to be applied to a low-pass filter 37 whose cut-off frequency is chosen at 2 KHz so that the noise component below 2 KHz is obtained at its output. This output is amplified to a desired level by an amplifier 38, and subsequently is rectified by a converting circuit 39 into a direct current for driving a meter relay 40. In more detail, the channel separation gate 36 consists of diodes 361, 362, 363 and 364, resistors 365 and 366, a capacitor 367 and a pulse transformer 368. Demodulation pulses are applied to a pair of terminals 369 and 370. The PAM signal is supplied via the terminal 35 to the gate 36, the output signal from which is applied to the low-pass filter 37. The output signal from the low-pass filter filter 37 is applied to and amplified by the amplifier 38, which consists of an operational amplifier 382 (above-mentioned type $\mu$A-709 IC, for example), resistors 381, 383 and 384 and a capacitor 385. The output signal from the amplifier 38 is supplied to the converting circuit 39 which consists of resistors 391, 394 and 397, a capacitor 398, diodes 392 and 393, an operational amplifier 396 (above-mentioned type $\mu$A-709 IC, for example), and a power supply 395, and is converted to a direct current signal. This direct current signal is supplied to the meter relay 40 to indicate the noise power.

Figure 4:
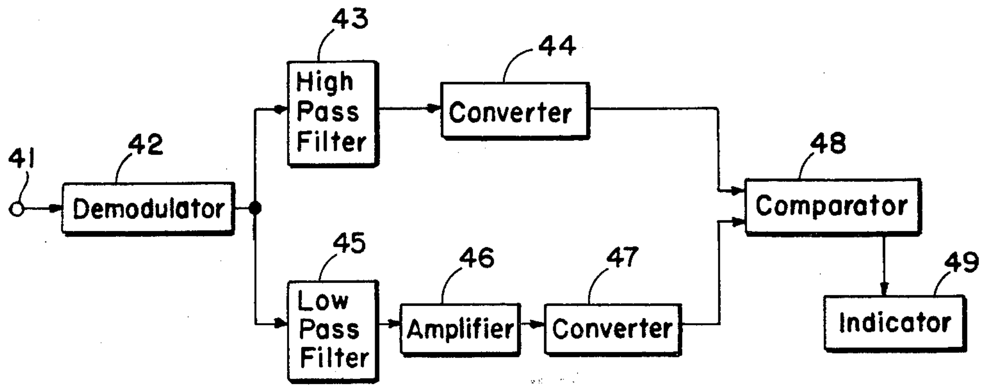
FIG. 4 is a block diagram of an embodiment of the invention.

Another embodiment of the invention is shown in FIG. 4, in which only the receiving terminal is shown, the transmitting terminal being similar to that of FIG. 3(a). In FIG. 4, the decoded signal applied to an input terminal 41 is demodulated by a demodulator 42 into the superposed signal of the pilot signal and the distortion noise such as the quantizing noise. From this demodulated signal is extracted by a high-pass filter 43 the component above 2 KHz (referred to as main band power) to be converted to a direct current signal by a converter 44. On the other hand, from the demodulated output is extracted by a low-pass filter 45 the component below 2 KHz (referred to as distortion wave band power), which is amplified to a desired level by an amplifier 46 to be converted to a direct current signal by a converter 47. The output from the converters 44 and 47 are applied to a comparator 48, which obtains the ratio of the main band power (which is substantially equal to the signal power) to the distortion wave band power (which is substantially a half of the total distortion noise power), the output being supplied to an indicating device 49. With this structure it is possible to constantly monitor the signal-to-noise ratio which is the actual problem in the channel utilizational, though the circuit becomes complicated to some extent.

It should be understood that what has been described hereinbefore are merely illustrative embodiments of this invention, and the scope of the invention is not to be limited thereby. For example, while the white noise used as the pilot signal has been band-limited illustratively to 2 ~ 4KHz, any other frequency band may be adopted, or an emphasized noise may be used, to be properly chosen in consideration of the difficulties of band limiting, detection in the receiving terminal, and so on. It is also available to independently monitor the signal component power and the noise component power in the demodulated pilot signal output.

What is claimed is:

1. A malfunction monitoring system for a time division multiplexed pulse code modulation communication system including a transmitting terminal and a receiving terminal; said malfunction monitoring system comprising means in the transmitting terminal for modulating and time-division multiplexing a plurality of information signals, a noise signal source, means for inserting said noise signal as the pilot signal into an idle selected channel of said time-division multiplexed modulated signals, the frequency spectrum distribution of said noise signal being substantially continuous with a portion of the bandwidth corresponding to said idle selected channel, and means for coding and transmitting said multiplexed information and noise signals; said receiving terminal including means for decoding said signals, and a pilot signal channel having means for demodulating said decoded noise pilot signal, and means for monitoring the demodulated output of said pilot signal channel.

2. The malfunction monitoring system claimed in claim 1, further comprising means in said transmitting terminal for limiting the bandwidth of said noise signal; and means in the receiving terminal for separating the demodulated pilot signal channel output into a first power spectrum falling within said bandwidth and a second power spectrum falling outside of said bandwidth, said monitoring means including means for sensing the amplitude of at least one of said first and second power spectrums.

3. The malfunction monitoring equipment of claim 2, in which said separating means comprising a high-pass filter and a low-pass filter coupled to said pilot signal demodulating means, and said monitoring means comprises comparing means coupled to the outputs of said low-pass and high-pass filters for comparing the relative levels of the outputs of said filters.

4. The malfunction monitoring system of claim 2, further comprising means coupled to said bandwidth limiting means for maintaining the output power of said bandwidth limiting means at a substantially constant level.

5. The malfunction monitoring system of claim 4, in which said bandwidth limiting means comprises a bandpass filter, and further comprising at said receiver terminal a low-pass filter coupled between said separating means and said monitoring means.

* * * * *